United States Patent [19]
Whitney

[11] 3,935,740
[45] Feb. 3, 1976

[54] LIQUID LEVEL PROBE
[75] Inventor: John Butler Whitney, Rochester, N.Y.
[73] Assignee: Sybron Corporation, Rochester, N.Y.
[22] Filed: June 20, 1974
[21] Appl. No.: 481,127

[52] U.S. Cl. ............................................. 73/304 C
[51] Int. Cl.² ...................................... G01F 23/26
[58] Field of Search ................................. 73/304 C

[56] References Cited
UNITED STATES PATENTS
2,677,964   5/1954   Engelder ............................ 73/304 C

*Primary Examiner*—Herbert Goldstein
*Assistant Examiner*—Anthony V. Ciarlante
*Attorney, Agent, or Firm*—Theodore B. Roessel; J. Stephen Yeo

[57] ABSTRACT

A capacitive probe for gauging the level of liquid within a reaction tank, or the like, in which the capacitive probe is formed by an electrode strip affixed to a pre-existing elongated member which projects into the reactor tank, wherein the tank and the strip define two electrodes of a capacitor.

3 Claims, 3 Drawing Figures

LIQUID LEVEL PROBE

BACKGROUND OF THE INVENTION

This invention relates generally to a liquid level measuring arrangement and more particularly concerns a liquid level measuring arrangement using capacitive probes which are placed within reactor tanks and the like.

The chemical industry and the food processing industry use a substantial number of vessels such as reactor tanks. Such reactor tanks are used for the storage and transport of liquids, for the chemical reaction of solids and liquids, and the like.

The structure of the tank is commonly steel so as to withstand the temperature and pressure ranges of the product processing. The products contained within these reactor tanks can be corrosive to bare metal. As protection against corrosion of the tank material and subsequent contamination of the product the interior of the reactor tanks are often enameled with glass or glass ceramics or the like. The resultant glassed steel is resistive to all concentrations of all acids except hydrofluric to 212°F and to most alkalis at moderate temperatures. Many acid solutions having temperatures up to 450°F can be processed. The glass exhibits no catalytic effect in any known case. It does not stimulate undesired side reactions so the product uniformity and yield may be higher than can be achieved with bare metal. Since the glass is inert, the use of glass steel equipment eliminates the possibility of metal contamination. Additionally, the smooth hard surface of glassed steel resists adherence by many products such as synthethic rubber, plastic and resins whch would cling to a bare metal surface.

The common application for the reactor tank is the stirring or mixing of various liquids. To accomplish this purpose an agitator is provided, the agitator is usually driven by an external motor which drives a shaft connected to agitating blades immersed in the liquids. The shaft enters the tank by means of a stuffing box or rotatry seal or the like. A stationary member or baffle, as it is known in the trade, is immersed in the liquid in proximity to the agitating blades to enhance the agitator's action. The agitator stirs the liquid against the baffle which deflects it back to the blades.

It is often necessary to determine the level of the liquid contents of the reactor tank. One approach is to use capacitive probes to gauge the liquid within the tank. The prior art has used one or more elongated electrodes extending from atop the tank into the liquid. If a single probe is used, the capacitance between the probe and the wall of the tank is considered. If two or more probes are used the interprobe capacitance is considered.

In describing the principal of operation, we recall that any pair of electrodes form a capacitor, the value of which is determined by the effective area of the electrodes, the distance between the electrode and the dielectric constant of the media between the electrodes, herein the probe and the tank walls. In gauging the liquid in a tank, the dielectric media will vary depending upon the fluid level. The variance in capacitance is approximately linear with the liquid level of the effective area of the electrodes is constant within the tank. the capacitance of the probe may be measured by a capacitance bridge or the like and so determined. By calculations or calibration the corresponding liquid level in the reactor tank can be deduced from the value of capacitance.

The probe is usually a separate member extending vertically from the top of the tank into the liquid to be measured. The member is commonly a metal rod covered with an insulator. When non-conductive liquids are being measured, the insulator can be eliminated. The probe is usually introduced external to the tank and extended vertically through the tank to be immersed in the fluid. As aforementioned, these tanks are used for a great variety of processes, many of which involve pressure and temperature extremes. As a result, any entry into the tank requires expensive and complicated pressure seals. Additionally, spaces for tank openings or nozzles are at a premium in reactor vessels and are, therefore, to be avoided when possible.

It would, therefore, be highly desirable if an independently existing member, such as a baffle could also be used as a capacitive probe. For reasons concerning mixing actions and fluid mechanics, however, baffles normally have non-uniform cross sections and therefore the effective area of the capacitor will vary causing non-linear changes in capacitance as the liquid level varies. In some applications, the tank may not be cylindrical and it would be desirable to offer ready means to shape the profile of the probe in accordance with the tank shape to obtain linear response. An ideal probe should be inexpensive yet rugged so as to withstand the abuse encountered under forseeing conditions.

It is, therefore, and object of this invention to provide a new and improved capacitive gauge for measuring the level of a liquid in a tank.

A further object of this invention is to provide new and improved capactive gauge that utilizes an existing member of a tank as a capacitive probe, even where the existing member has a non-uniform cross section and or configuration.

An additional object of the invention is to provide a new and improved capacitive probe having a effective area to compensate for tank shapes.

Another object of this invention is to provide a new and improved enable capacitive probe being rugged, yet inexpensive.

SUMMARY OF THE INVENTION

In accordance with the invention, a capacitor probe for gauging the level of a liquid within a reactor tank wherein an elongated member projects vertically from the top of said tank into said tank, and extending a substantial portion of the height of said tank. At least a portion of the surface of said member is electrically insulated by insulating means. A strip electrode is surrounded by said insulating means and extends vertically, along the surface of said elongated member. The electrode forms a capacitor with the tank. The magnitude of the capacitor can be determined by conventional means, and is dependent upon the dielectric constant of the medium between the immersed portion of said electrode in said reactor tank. The value of capacitance is indicative of liquid level between the strip electrode and the tank. The shape of a strip electrode may be modified to compensate for varation in the tank shape.

BRIEF DESCRIPTION OF THE DRAWINGS

Other objects and advantages of the invention will become apparent upon reading the following detailed description and upon reference to the drawings in FIG. 1 is a diagram of a typical reactor tank including the capacitive probe of the present invention.

DETAILED DESCRIPTION OF THE DRAWINGS

Figure 1:
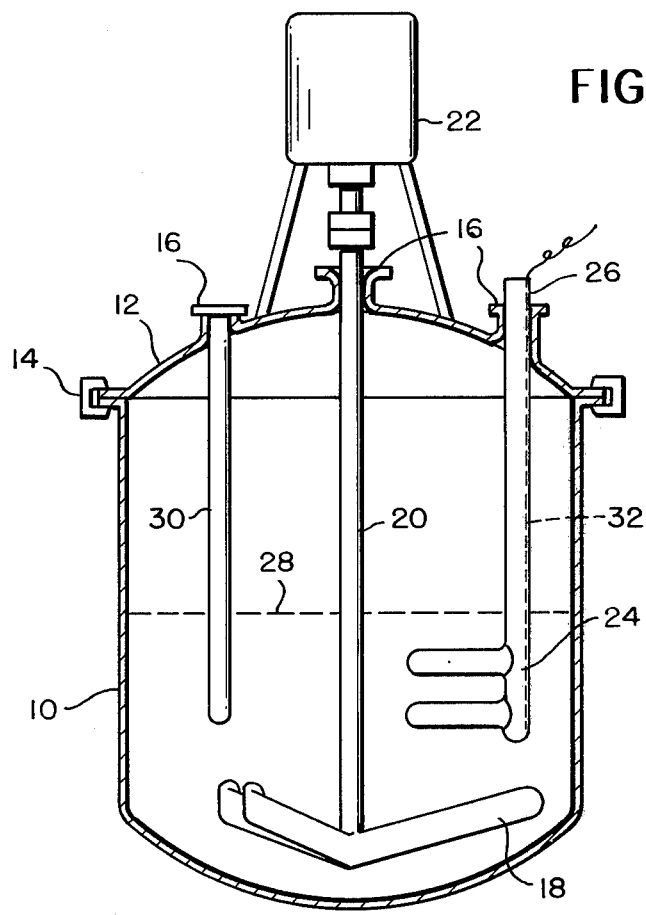

Turning first to FIG. 1, there is shown a diagram of a typical reactor tank. The tank includes a tank body 10 which may be welded pressed steel with the inner surface glassed. Mating to the top of the tank is a cover 12 also made of glassed pressed steel. Flanges 14 are used to clamp the cover and the tank together. The cover 12 contains a plurality of openings or ports 16 for external access to the interior of the tank. A plurality of agitator blades 18 are attached to a shaft 20 which is axially positioned without the tank and which extends through a tank opening 14 and is driven by a motor 22. In proximity to the agitator blade 18 is a baffle 24 suspended by a shaft 26 from the cover 12. The surface of a contained liquid is represented by a dashed line 28. Typically, the liquid immerses the agitator blades 18 and at least part of the baffle 24. In some applications, the temperature of the liquid is measured by a temperature probe 30 immersed in the liquid and suspended from the cover 12.

The present invention provides for gauging the level of the liquid without the necessity of introducing supplemental structures. This is accomplished in the present instance by affixing an elongated electrode strip or capacitive probe 32 to the insulator surface of the baffle 24. Alternatively, the temperature probe 30 or any other existing member may be used for support. The electrode strip or capacitive probe 32 is aligned along the elongated dimension of said of said baffle shaft, having its lower end immersed in the contained liquid. The depth of immersion, of course, depends upon the level of the liquid 28 within the tank. The electrode 32 forms a capacitor with the metallic members of the tank. The magnitude of the capacitor is a function of the effective area of the electrode in the tanks, the distance between the electrode and the tank the dielectric constant of the media separating the electrode in the tank. In this case, it is seen that the capacitance will vary as a approximately linear function of the liquid level in the tank. The capacitance can be measured by conventional instrumentation such a Drexelbrook Engineering Model 408-4000 Capacitance Level Controller.

Figure 2:
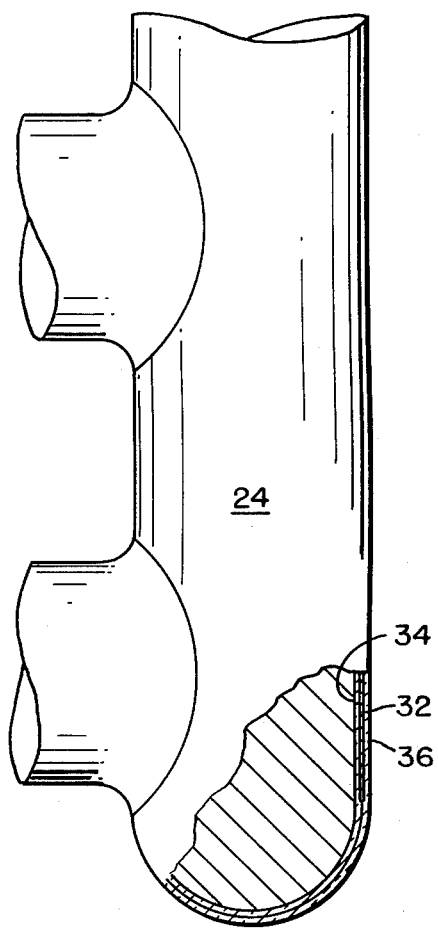
FIGS. 2 and 3 are detailed views of the liquid level capacitive probe as constructed upon a member of the tank shown in FIG. 1.
Figure 3:
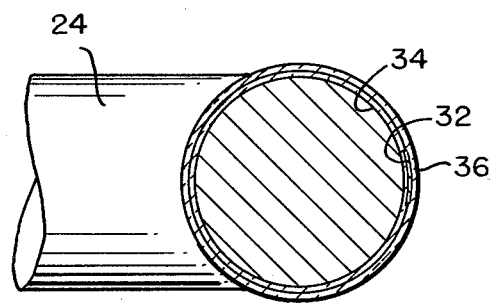

FIGS. 2 and 3 are detailed views of the capacitor probe strip electrode 32 as mounted on the baffle 24. The baffle 24 may be constructed of steel at least part of the surface, therefore, has a glass layer 34. An elongated conductive foil strip 32 is mounted substantially along the vertical length of the baffle. A second layer of glass 36 is coated over the baffle 24 and covers the foil strip. Further details on how to affix conducting elements to a glassed surface may be obtained from U.S. Pat. No. 3,563,808. Temperature Measuring Means for Element Device, by H. Scharback et al, issued Apr. 18, 1968. External to the tank, electrical contact is made with the foil strip.

Tests were run in a reactor tank similar to that as shown in FIG. 1. The results of the tests indicated that using capacitive measurement techniques it was possible to zero out stray capacitance between the strip electrode of the probe and the tank under the end points of an empty and a full tank. After such calibration, the capacitive measurement equipment gave a substantially linear output as the level within the tank was changed.

I claim:

1. A liquid level capacitor probe for a reactor tank having an elongated member having a glass coating and projecting vertically from the top of said tank into said tank and extending a substantial portion of the height of said tank, said liquid level capacitor probe comprising:

insulating means including said glass coating on said member for electrically insulating and protecting at least a portion of the surface of said member; and a strip electrode extending in the elongated dimension of said member and attached to said glass coating and surrounded by another glass coating, said strip electrode thereby forming a capacitor with said reactor tank, the magnitude of which is dependent upon the dielectric constant media between said electrode and said reactor tank.

2. A liquid level capacitor probe as defined in claim 1 wherein said elongated member is a baffle.

3. A liquid level capacitor probe as defined in claim 1 wherein said strip electrode is formed by a length of conductive ribbon.

* * * * *